Aug. 17, 1943.  C. WOLF  2,327,233
TIMBER SAW
Filed April 9, 1940  3 Sheets-Sheet 1

INVENTOR
CHARLES WOLF
BY
ATTORNEY

Aug. 17, 1943. C. WOLF 2,327,233
TIMBER SAW
Filed April 9, 1940 3 Sheets-Sheet 2

INVENTOR
CHARLES WOLF
BY E. B. Birkenbeuel
ATTORNEY

Aug. 17, 1943.　　　C. WOLF　　　2,327,233
TIMBER SAW
Filed April 9, 1940　　　3 Sheets-Sheet 3
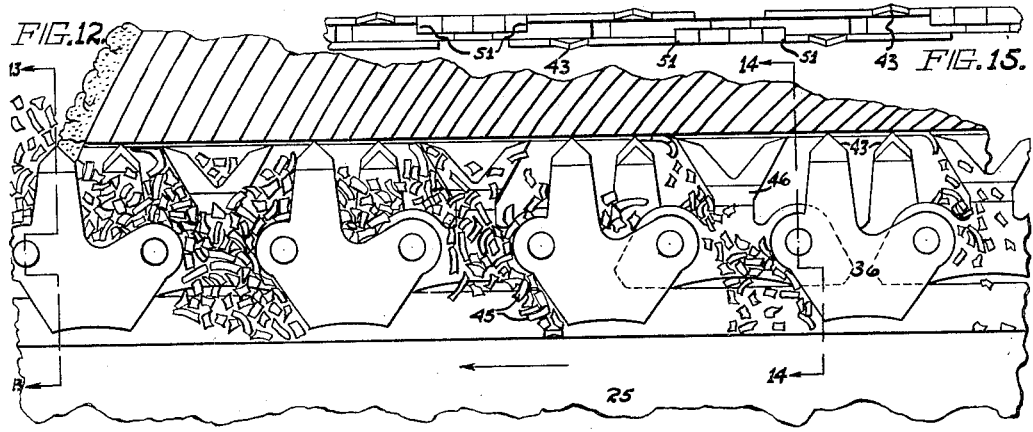
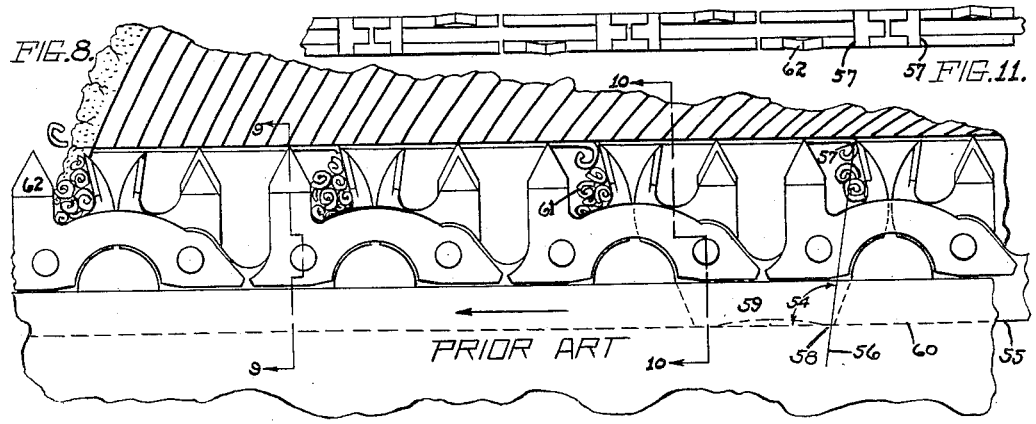
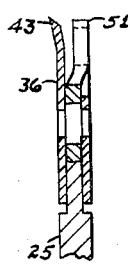 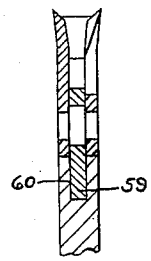 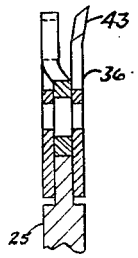 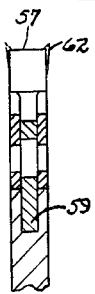
FIG.13.　　FIG.9.　　FIG.14.　　FIG.10.
　　　　　PRIOR ART　　　　　　PRIOR ART
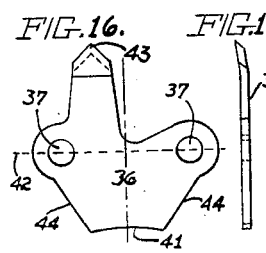  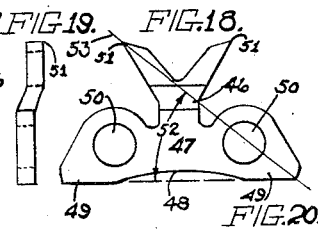 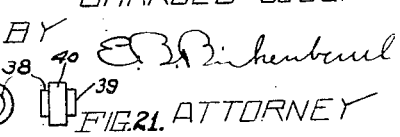 
INVENTOR
CHARLES WOLF
BY
ATTORNEY Patented Aug. 17, 1943

2,327,233

UNITED STATES PATENT OFFICE 2,327,233

TIMBER SAW

Charles Wolf, Portland, Oreg.

Application April 9, 1940, Serial No. 328,627

3 Claims. (Cl. 143—135)

This invention relates generally to saws, and particularly to a timber saw of a portable type.

The main object of this invention is to construct a saw of the class described which will perform a greater amount of work at the expense of less energy and wear on the saw parts than is occasioned by the use of similar saws now in use, reference being made to my prior Patents Nos. 1,397,026; 1,526,451; and 2,165,524, over which the saw described herein is an improvement.

The second object is to produce a saw of the class described having a greatly increased sawdust carrying capacity.

The third object is to produce a saw of the class described whose raker teeth are not swedged but which will have all of the knot cutting property of a swedge tooth and in addition thereto provide passageways and clearance for the sawdust and chips being formed.

The fourth object is to produce a saw of the class described wherein the "buckling" tendency is reduced and the necessity for driving the chain at an excessive initial tension is eliminated.

The fifth object is to construct a saw of the class described having an improved form of self-lubricating sprocket wheel and having an improved form of breaker pin which is especially accessible and also having an improved form of construction wherein objectionable clearances may not develop due to the saw being operated after the breaker pin has been severed.

The sixth object is to construct a saw of the class described having an improved form of assembling connection between the saw frame and the power unit.

The seventh object is to construct a saw of the class described especially adapted for use with air motors and having a saw guiding lever which may be turned to any of a plurality of guiding positions to suit the convenience of the operator.

These and other objects are accomplished in the manner set forth in the following specification as illustrated in the accompanying drawings, in which:

Fig. 8 is a section through a saw cut showing the prior art so illustrated in my prior Patent No. 1,397,026.

Fig. 9 is a section taken along the line 9—9 in Fig. 8.

Fig. 10 is a section taken along the line 10—10 in Fig. 8.

Fig. 11 is a fragmentary plan of a portion of the plan shown in Fig. 8.

Fig. 12 is a section through a saw cut showing the action of my improved saw which forms the basis for this invention.

Fig. 13 is a broken section taken along the line 13—13 in Fig. 12.

Fig. 14 is a section taken along the line 14—14 in Fig. 12.

Fig. 15 is a fragmentary plan of a portion of my improved saw shown in Fig. 12.

Fig. 16 is a side elevation of a cutter tooth link.

Fig. 17 is an end elevation of the cutter tooth link.

Fig. 18 is a side elevation of a raker block link.

Fig. 19 is an end elevation of a raker block link.

Fig. 20 is an end elevation of a link pin.

Fig. 21 is a side elevation of a link pin.

Similar numerals refer to similar parts throughout the several views.

Figure 1:
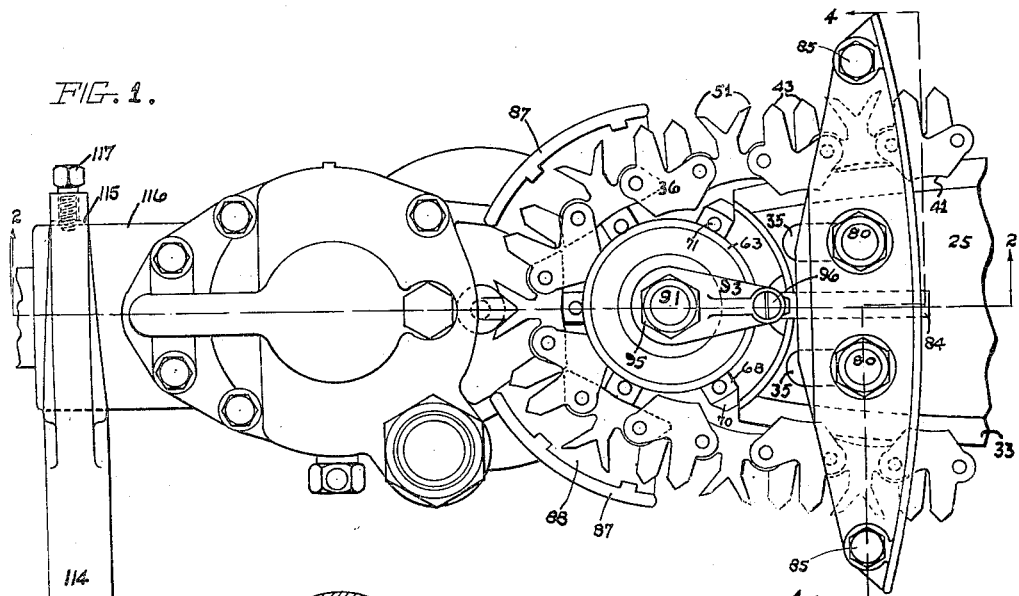
Fig. 1 is a fragmentary plan of the power unit end of the saw.
Figure 2:
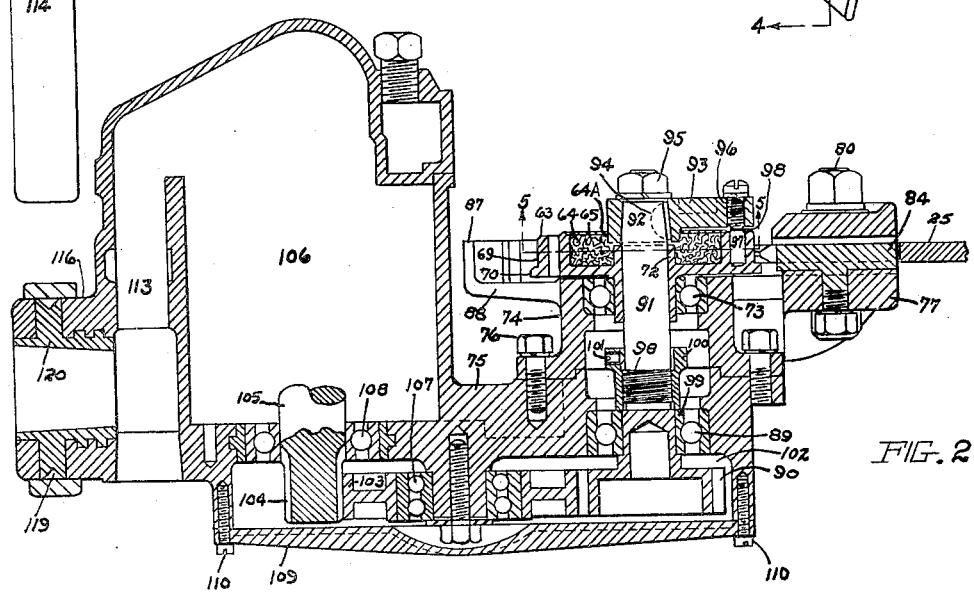
Fig. 2 is a section taken along the line 2—2 in Fig. 1.
Figure 3:
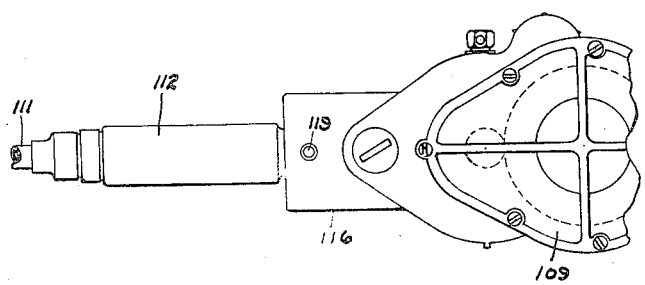
Fig. 3 is a fragmentary side view of the device showing the control handle.

Before entering into a description of this invention, it is stated that chain saws have long been in common use and saws corresponding with Fig. 8 of the drawings have been in use for the past twenty years.

The saw which I am about to describe consists primarily of a guide bar, which I shall refer to as a saw track frame, together with a saw chain unit and a power unit.

Saw track frame

The saw track frame consists of an elongated bar 25 of a flat material having the somewhat convex edges 26 which at one end are tangent to the semi-circular end 27 and that the other ends 28 merge into the straight portions 29 which are normal to the longitudinal axis of the frame 25. The portions 29 are joined by the arcuate cutout portion 30 in the center of which is formed a slot 31, the purpose of which will be explained later.

Handholds 32 are preferably formed in the frame 25. A tongue 33 is formed around the curved edges 26 and the rounded end 27, and it is this tongue 33 which forms the track or raceway for the saw chain about to be described. The wearing surface is on the edges 26 and the sides of the tongue 33, no wear occurring on the edge 34. Bolt slots 35 are formed in the end of the frame 25 on opposite sides of the slot 31.

Saw chain unit

The saw chain unit consists of three different kinds of parts, the first of these parts is the cutter tooth link 36 shown in Figs. 16 and 17 having the spaced holes 37 adapted to receive the reduced ends 38 of the link pin 39 having an enlarged circular portion 40.

The cutter tooth link 36 has an arcuate base 41 which extends on one side of a line 42 passing through the holes 37 while the cutter tooth 43 extends on the opposite side of the line 42 nearer to one of the holes 37 than it is to the other hole 37. The edges 44 of the link 36 converge to afford clearance for the sawdust and chips 45. The cutter teeth 43 are preferably provided with the required amount of "set."

The raker block links 46 are provided with an elongated base 47 having its intermediate portion 48 arcuate in form and its end portions 49 straight. It is the end portions 49 which ride upon the rim or edge 26 of the frame 25. The links 46 are provided with the holes 50 which receive the enlarged circular portion 40 of the link pin 39.

Each rocker block link 46 is provided with two oppositely turned raker teeth 51 which are offset as shown in Fig. 19. Both of the teeth 51 on a given link 46 are offset in the same direction, but the links are assembled in alternate fashion, that is, alternate links 46 have their teeth offset on opposite sides. The effect of this construction is to give the saw all of the advantages of a swedge tooth without the expense which accompanies the performing of a swedging operation and with the additional advantage of improving the cutting action of the raker tooth and at the same time providing a greatly increased sawdust carrying capacity for the saw.

Since it is the raker tooth 51 which performs the hardest work, it follows that it is the resistance encountered by the raker tooth 51 which causes the greatest amount of "buckling" action in the saw.

It will be noted that the angle 52 which is formed between the base line 49 and the line 53 is much smaller than the angle 54 between the base line 55 of the prior art raker teeth shown in Fig. 10 and the line 56 which passes through one of its raker teeth points 57 and the adjacent corner 58 of the raker tooth base 59 which rides in a slot 60 as shown in Fig. 9.

By this it is meant that since the raker teeth do most of the work, they exert the greatest kinking or tilting action. It follows that this action is minimum when the cutting by the raker teeth occurs most near in alinement with the travel of the center of the pin 39 and maximum when the cutting points of the raker teeth are normal to the travel at the center of the pin 39. In other words, the angle 52 as shown in Fig. 18 is nearer to the parallel position while the angle 54 is nearer to the normal position of maximum tilting or kinking action.

In other words, the improved form of raker tooth 51 shown in Fig. 12 is far more stable than is my prior art tooth 57 shown in Fig. 8.

It will be noted that in my present saw the raker block links 46 ride upon the outermost portion 26 while the cutter tooth links 36 ride against the sides of the tongue 33.

It will be seen in Fig. 8 that the carrying capacity of the saw is limited to the number of chips 61 which can fill the lower portion of the space between a cutting raker point 57 and the next foremost cutter tooth 62. In my improved form of the device as shown in Fig. 12 the chips 45 are not confined to a small space but can occupy substantially the entire space unoccupied by the links 36 and 46, due largely to the fact that the size of the chips is materially reduced.

Since the ability of a saw is largely limited by its capacity to convey away the material loosened by the teeth, it follows that the cutting action of the saw is greatly improved and the amount of power required to perform the operation is materially lessened.

Power unit

Figure 5:
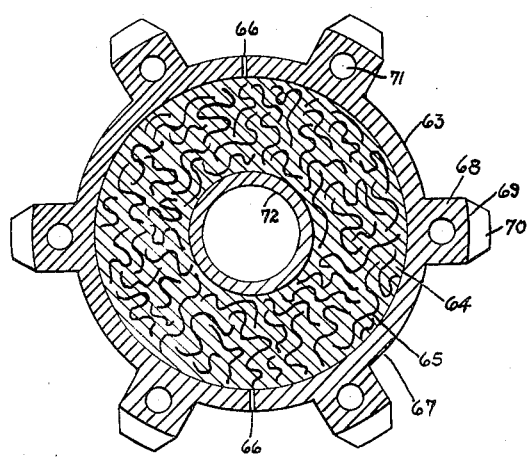
Fig. 5 is a section taken along the line 5—5 in Fig. 2.

In order to supply rotation to the chain element composed of the links 36 and 46, there is provided a driving sprocket wheel 63 having an annular reservoir 64 formed therein to receive the lubricant retaining material 65. A cover plate 64—A is provided as a closure for the reservoir 64. Small holes 66 are formed in the cylindrical surface 67 of the sprocket wheel 63 and communicate with the interior of the reservoir 64. (See Fig. 5.)

Radiating from the surface 67 are the raker link supporting sprockets 68 whose outermost edges 69 are curved to conform with the intermediate portion 48 of the raker link 46.

A lateral flange 70 is formed on one side of all of the sprockets 68 and serves to hold the driving portion of the chain in position.

Each sprocket 68 has formed therethrough a round hole 71. The sprocket wheel 63 is provided with a central hub 72 which journals in the anti-friction bearing 73 which in turn is carried by a saw frame support 74 which is secured to the housing 75 by means of the bolts 76. The support 74 has formed integral therewith a combined face plate and saw stop 77 whose surface 78 engages the side of the bar 25 and is secured thereto by means of a clamp 79 by the bolts 80 which pass through the slots 35 and corresponding holes 81 in the clamp 79 and into the tapped holes 82 in the member 77.

The surface 78 is provided with a key slot 83 in which is placed a key 84 which occupies the slot 31 and holds the bar 25 in angular alinement, while the slots 35 permit longitudinal adjustability for the purpose of adjusting the chain tension. Additional bolts 85 are used to secure the outermost ends of the clamp 79 to the member 77.

Raceways 86 are formed between the members 77 and 79 to permit the free passage of the chain element.

Arcuate guards 87 extend around the driving end of the chain portion of the saw and are connected to the support 74 by means of the flange 88.

In the housing 75 is located an anti-friction bearing 89. A spur gear 90 has a spindle 91 formed integral therewith. The spindle 91 is supported at one end by the bearing 89 and at the other end by the hub 72 of the sprocket wheel 63. The spindle 91 has its tapering end 92 provided with a breaker pin arm 93 which is secured thereto by means of a key 94 and the nut 95. The arm 93 has threaded therein a screw 96 whose end 97 projects into one of the openings 71. The end 97 has a reduced area 98 which will shear under excessive load.

The purpose of this construction is to minimize the wear on the parts occurring between the moment of severance of the member 97 and the stopping of the prime mover.

The spindle 91 is provided with a thread 98 and is clamped to the inner race 99 of the bearing 89 by means of the nut 100 which nut is locked in position by means of the set screw 101.

The housing 75 has formed therein a recess 102 which contains the gear 90 and also an idler gear 103 which is interposed between the gear 90 and the driving pinion 104 which is formed on the power take-off shaft 105 of the prime mover not shown, but which is contained within the compartment 106 formed within the housing 75. It is desirable to provide anti-friction bearings 107 and 108 for the gear 103 and the shaft 105. A cover plate 109 is secured over the recess 102 by means of the screws 110.

The prime mover in this case is an air motor and air is supplied thereto from the hose 111 through the control handle 112 from whence it finds its way through the passageway 113 to the motor.

In order to guide the saw there is provided a handle 114 having a circular opening 115 in one end thereof which is adapted to receive the cylindrical projection 116 of the housing 75. The position of the handle 114 is fixed by the set screw 117 whose point 118 is adapted to occupy one of the countersunk openings 119 disposed about the circumference of the fitting 120.

In order to simplify the understanding of this invention a description of lesser important details have been condensed.

It is desirable to provide a handle 121 at the forward end of the bar 25 and this is attached by means of a handle support 122 by the bolts 123.

It will be seen from the foregoing that as the chain passes around the sprocket wheel 63, the action of the chain is equivalent to that of a twelve tooth sprocket rather than that of a six tooth sprocket, that is, the angular motion between adjacent links is one-half of that of a six tooth sprocket wheel, which is of course desirable.

As stated, the raker tooth surface 48 rests upon the sprocket surface 69 whereas the arcuate bases 41 of the cutter links 36 ride upon the cylindrical surface 67 of the sprocket wheel 63.

It must be understood that while this saw has been illustrated and described for use with an air motor, it is equally usable with other forms of prime mover, such as an electric motor, it being necessary only to apply the power to the gear 90 in any convenient manner.

From the foregoing it will be seen that owing to the increased sawdust carrying capacity of the saw, its cutting capacity is increased even at a reduced speed, it being customary, for example, to operate my saw shown in Fig. 8 at twelve hundred feet per minute, while the present saw will cut faster at one thousand feet per minute.

Figure 7:
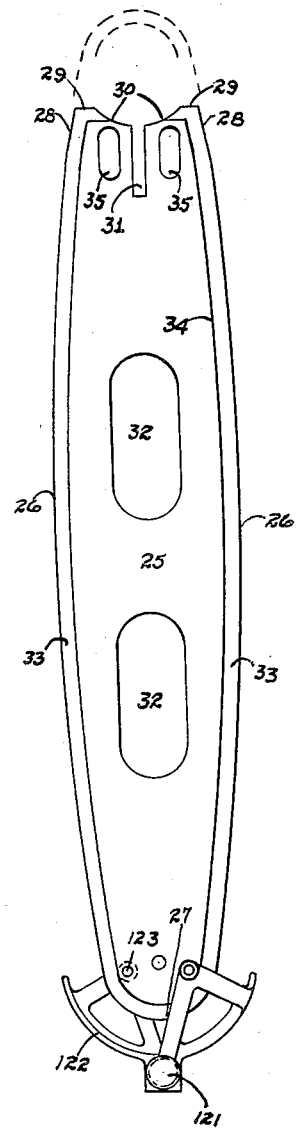
Fig. 7 is a side elevation of the saw track frame.
Figure 4:
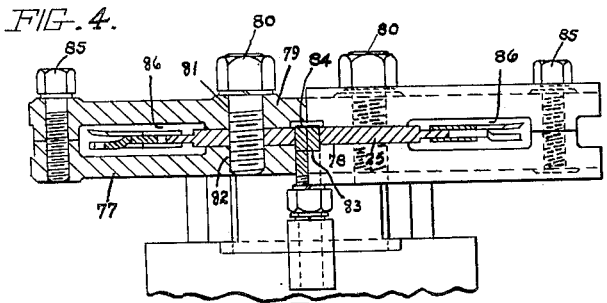
Fig. 4 is a broken section taken along the line 4—4 in Fig. 1.
Figure 6:
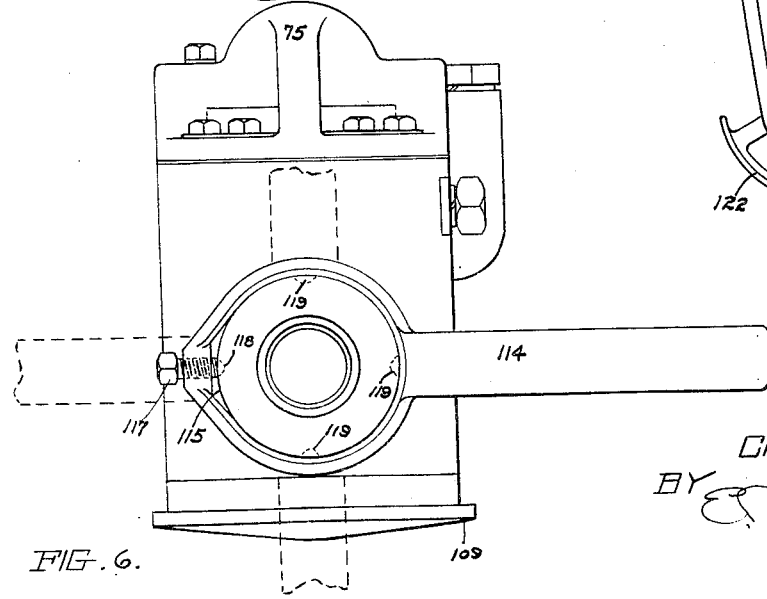
Fig. 6 is an end elevation of the power unit and of the saw showing a position of the guide lever in full lines and three other possible positions in dotted lines.

It will be noted that the saw bar shown in Fig. 7 is flat and symmetrical on both sides and capable of reversing for the purpose of distributing the wear between both edges of the bar 25.

It will be observed that with the construction herein described that the saw chain is actually alined as it is driven toward the sprockets 68, thereby requiring no lateral guidance therefrom and consequently minimizing the wear on the chain and sprockets at that point.

The flanges 70 are merely employed to support that portion of the chain which is lying around the sprocket while the chain is being installed. After installation, the flanges 70 have little useful purpose.

I claim:

1. In a chain saw, a raker tooth link having an elongated base constituting a slide, said base having a pair of pin holes formed therein near opposite ends thereof, a pair of oppositely turned raker teeth projecting from one edge of said base and offset laterally therefrom, the lateral thickness of all parts of the link and raker teeth being uniform the offset portions of the links being substantially parallel with the body thereof.

2. In a chain saw, a raker tooth link having an elongated base constituting a slide having straight line ends and having a concave intermediate portion, said base having pin holes formed therein near the ends thereof, said link having oppositely turned laterally offset raker teeth of the same lateral width as is said base and substantially parallel therewith.

3. A chain saw consisting of alternate single block links and double cutter links, the body of each block link having two oppositely pointed drag teeth formed thereon offset laterally, and in parallelism with the body thereof, the teeth of one block link being both offset in the same direction and the teeth in successive block links being offset in opposite directions, said cutter links having cutter teeth formed thereon which are not offset but are set angularly with relation to the bodies of the cutter links, said drag and cutter teeth forming a continuous tortuous passageway for the storage of sawdust while said teeth are passing through a given cut.

CHARLES WOLF.